United States Patent
Gilboy et al.

(10) Patent No.: US 6,400,815 B1
(45) Date of Patent: Jun. 4, 2002

(54) METHOD AND APPARATUS FOR SUBSCRIBER LINE TO TELEPHONE CALL DISTRIBUTION

(75) Inventors: Christopher P Gilboy, Freehold; Robert Bergman Levy, Branchburg, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/576,466

(22) Filed: May 23, 2000

(51) Int. Cl.⁷ .................................................. H04M 9/00
(52) U.S. Cl. .................. 379/171; 379/167.01; 379/172; 379/179
(58) Field of Search .................................. 379/157, 164, 379/165, 171, 177, 161, 142.07, 142.12, 142.13, 142.15, 142.16, 167.01, 179

(56) References Cited

U.S. PATENT DOCUMENTS

| | | |
|---|---|---|
| 4,700,379 A | 10/1987 | Ingebright |
| 5,428,608 A | 6/1995 | Freeman et al. |
| 5,537,436 A | 7/1996 | Bottoms et al. |
| 5,602,846 A | 2/1997 | Holmquist et al. |
| 5,606,599 A | 2/1997 | O'Mahony et al. |
| 5,623,537 A * | 4/1997 | Ensor et al. ............... 379/67.1 |
| 5,636,218 A | 6/1997 | Ishikawa et al. |
| 5,682,386 A | 10/1997 | Arimilli et al. |
| 5,684,825 A | 11/1997 | Ko |
| 5,809,070 A | 9/1998 | Krishnan et al. |
| 5,887,054 A * | 3/1999 | Burke et al. ................. 379/159 |
| 6,020,916 A * | 2/2000 | Gerszberg et al. ........ 379/93.17 |
| 6,134,320 A * | 10/2000 | Swan et al. .................. 379/142 |
| 6,219,411 B1 * | 4/2001 | Peters et al. ................. 379/177 |
| 6,263,063 B1 * | 7/2001 | Bansal et al. ................ 379/164 |

OTHER PUBLICATIONS

Tewani, K., Requirements on PSTNs to Support Evolving Multimedia Applications, International Telecommunication Union; May 1995.
Multi–media Packet Protocol; Sep. 1995.
Protocol Proposals for the Network Interface in Support of Multi–media Applications in PSTN Environments; Sep. 1995.
Control Channel Requirements for the Network Interface in Support of Multi–media Applications in PSTN Environments; Sep. 1995.
Control Channel Signaling Requirements; Nov. 1995.
Control Channel Signaling Protocol; Nov. 1995.

* cited by examiner

Primary Examiner—Curtis Kuntz
Assistant Examiner—Rexford N Barnie
(74) Attorney, Agent, or Firm—Robert B. Levy (57) ABSTRACT

A Network Interface Unit (38, 38', 38") routes incoming calls to, and outgoing calls from, a plurality of telephone sets (12–22) at a subscriber premises (24). The Network Interface Unit continuously monitors for incoming calls and the availability of telephone sets. Upon receipt of a call, the Network Interface Unit determines which telephone sets are idle and applies a distinctive ring to each idle telephone set o identify the telephone line or equivalent on which the call was received. Once a telephone set goes off hook, the Network Interface Unit routes the call to that set and releases the remaining telephone sets for subsequent calls. When a subscriber initiates an outgoing telephone call, the Network Interface Unit detects the call and routes it on an idle outgoing telephone line or equivalent.

17 Claims, 5 Drawing Sheets

METHOD AND APPARATUS FOR SUBSCRIBER LINE TO TELEPHONE CALL DISTRIBUTION

TECHNICAL FIELD

This invention relates to a technique for dynamically routing calls to and from individual telephone sets at a subscriber premises.

BACKGROUND ART

Presently, most subscriber premises, and particularly, residences and small businesses have each incoming telephone line hard-wired to an individual telephone set or to multiple telephones through a branch premises line. For a telephone set to receive calls on separate lines, each line must run to that set. Additionally, the telephone set must possess multi-line capability. Many residential subscribers initially commence service with a single telephone line and then add a second or even a third line at a latter time to accommodate teen-age children, to access the Internet via a dial-up connection, or to receive business calls. Similarly, a small business may commence service with a single line, and then add additional telephone lines as business expands. Most subscribers that add additional telephone lines do not wish to incur the cost of multi-line phones and the expense of running each additional telephone line to each multi-line telephone set.

Thus, there is a need for a technique for dynamically routing incoming calls to and outgoing calls from, different telephone sets to overcome the aforementioned disadvantages of the prior art.

BRIEF SUMMARY OF THE INVENTION

Briefly, in accordance with the invention, there is provided a method for dynamically routing calls to and from each of a plurality of telephone sets at a subscriber's premises to allow each set to receive or initiate a call on one of a plurality of incoming lines or their equivalent. On a continuous basis, the communications path to each telephone set is monitored for availability. When a call is received on a particular incoming line or equivalent, a check is made to determine which communication path (and which telephone set) is idle. Thereafter, a distinctive ringing signal is applied on each idle path. The ringing signal causes each telephone set on that idle path to generate a distinctive ring that is typically associated with the particular telephone line or equivalent on which the call was received. The idle communications paths are thereafter monitored to determine whether any of the telephone sets on an idle path have gone off-hook to answer the call, whereupon, the call is routed to the off-hook telephone set on the associated communications path. The remaining idle communications paths (i.e., the communications paths on which the telephone sets remain on hook) are released for future calls.

When a subscriber seeks to initiate an outgoing telephone call, the subscriber goes off-hook on a telephone set associated with a particular communications. The off-hook condition is detected and in response, the call initiated from the now-off hook telephone set is routed to an idle outgoing telephone line or equivalent. If the subscriber seeks to place that outgoing call on a particular outgoing line or its equivalent that is idle, then the call is routed on that particular line or equivalent.

DETAILED DESCRIPTION

Figure 1:
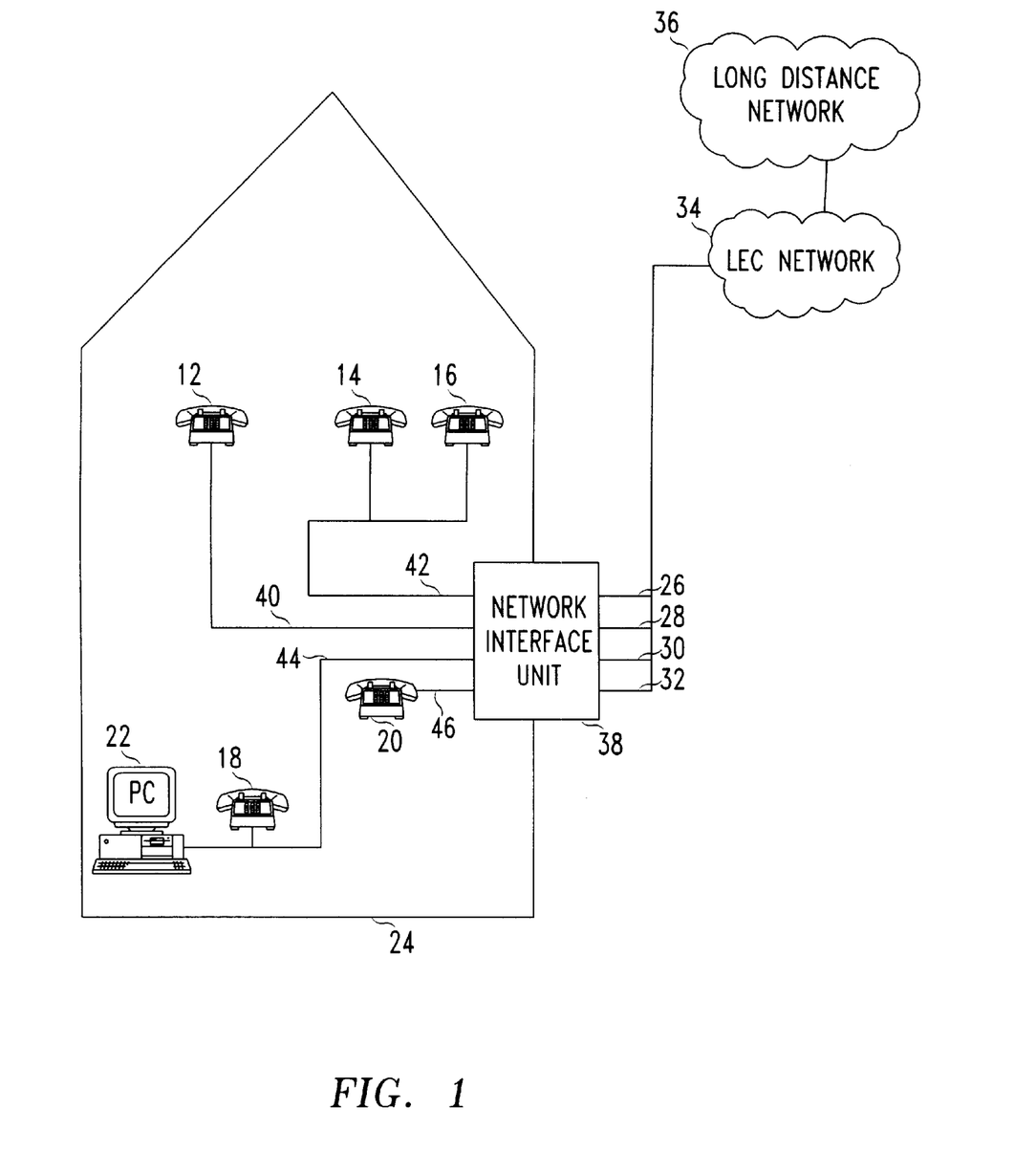
FIG. 1 is a block schematic diagram of an architecture in accordance with a first embodiment of the invention for dynamically routing calls to and from individual telephone sets at a subscriber's premises.

FIG. 1 shows an architecture in accordance with a first embodiment of the invention for dynamically routing calls between a plurality of telephone sets 12, 14, 16, 18, 20, and 22 at a subscriber's premises 24 and a plurality of telephone lines 26, 28, 30, and 32, each line having a unique telephone number. The telephone lines 26, 28, 30, and 32 receive local telephone service (e.g., dial tone) from a Local Exchange Carrier (LEC) network 34 linked to a Long Distance (Interexchange or IXC) network 36, such as the AT&T network. For purposes of the present invention, the telephone sets 12, 14, 16, 18, 20, and 22 may comprise conventional telephone sets, facsimile machines, personal computers or other devices capable of receiving a POTS (i.e., analog) telephone call. Rather than receive local telephone service from the LEC 34, a competitive access provider (not shown) could provide the telephone lines 26, 28, 30, and 32 with local service.

At the heart of the architecture of FIG. 1 is a Network Interface Unit 38 that enjoys a connection to telephone sets 12, 14 and 16, 18 and 22, and 20, via branch lines 40, 42, 44, and 46, respectively. As shown in FIG. 1, each premises branch line serves at least one, and some times a plurality of telephone sets. For example, branch premises lines 40 and 46 each serve a single telephone set (i.e., sets 12 and 20, respectively) while the branch premises lines 42 and 44 serve multiple telephone sets.

In accordance with the invention, the Network Interface Unit 38 advantageously routes a call received on a first one of the lines 26–32 to all of the idle premises branch lines 42–46 (i.e., all of the premises branch lines on which the corresponding telephone sets are on-hook). In routing a call, the Network Interface Unit 38 firsts rings the telephone sets on each idle premises branch line with a first distinctive ring associated with the incoming line on which the call was received. While a telephone set on a premises branch line remains off-hook, the Network Interface Unit 38, upon receiving a call on a next one of the telephone lines 26–32, routes the call to the remaining idle branch premises lines. In doing so, the Network Interface Unit 38 rings the telephone sets on the remaining idle branch premises lines with a second distinctive ring associated with the telephone line on which the call was received. For each subsequent call, the Network Interface Unit 38 causes the telephone set(s) on each remaining idle branch premises line to generate a distinctive ring associated with the telephone line on which the subsequent call was received.

Additionally, as discussed in detail below, the Network Interface Unit 38 advantageously serves to detect an off-hook condition associated with a telephone set on a branch premises line when a subscriber initiates an outgoing call. In response, the Network Interface Unit 38 provides a connection between the now off-hook telephone and an idle one of the incoming telephone lines 26–32. Indeed, the Network Interface Unit 38 will even provide a connection to a specific one of the incoming lines 26–32 in response to a request from the subscriber for a connection to that line if idle.

Figure 2:
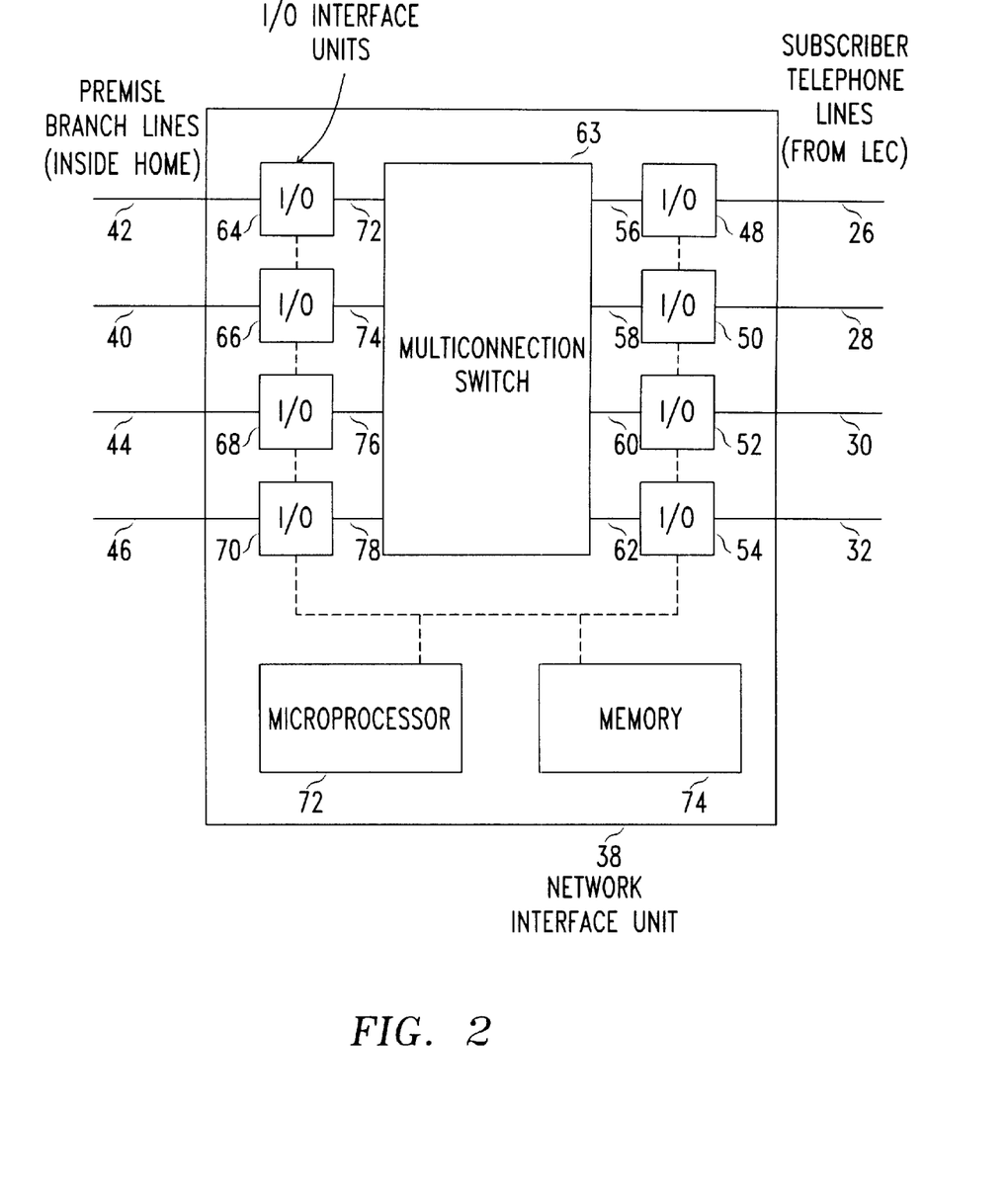
FIG. 2 is a block schematic diagram of a network interface unit comprising part of the architecture of FIG. 1.

FIG. 2 illustrates the Network Interface Unit 38 in detail. Within the Network Interface Unit 38, each of input/output (I/O) interface units 48, 50, 52, and 54, couples one of the telephone lines 48–54, respectively, to a corresponding one of a first set of ports 56, 58, 60 and 62, respectively, of a multi-connection switch 63. Each of interface I/O interface units 64, 66, 68, and 70 couples one of the branch premises lines 40, 42, 44, and 46, respectively, to a corresponding one of a second set of ports 72, 74, 76, and 78, respectively, of the switch 63. In practice, the switch 63 comprises a device, such as a cross-point array, capable of creating discrete call paths (physical links) between any of the first ports 56, 58, 60 and 62 and any of the second ports 72, 74, 76 and 78 for the duration of each call. The switch 63 operates under the control of a microprocessor 72 that receives stored program instructions as well as data from a memory 74.

Figure 3:
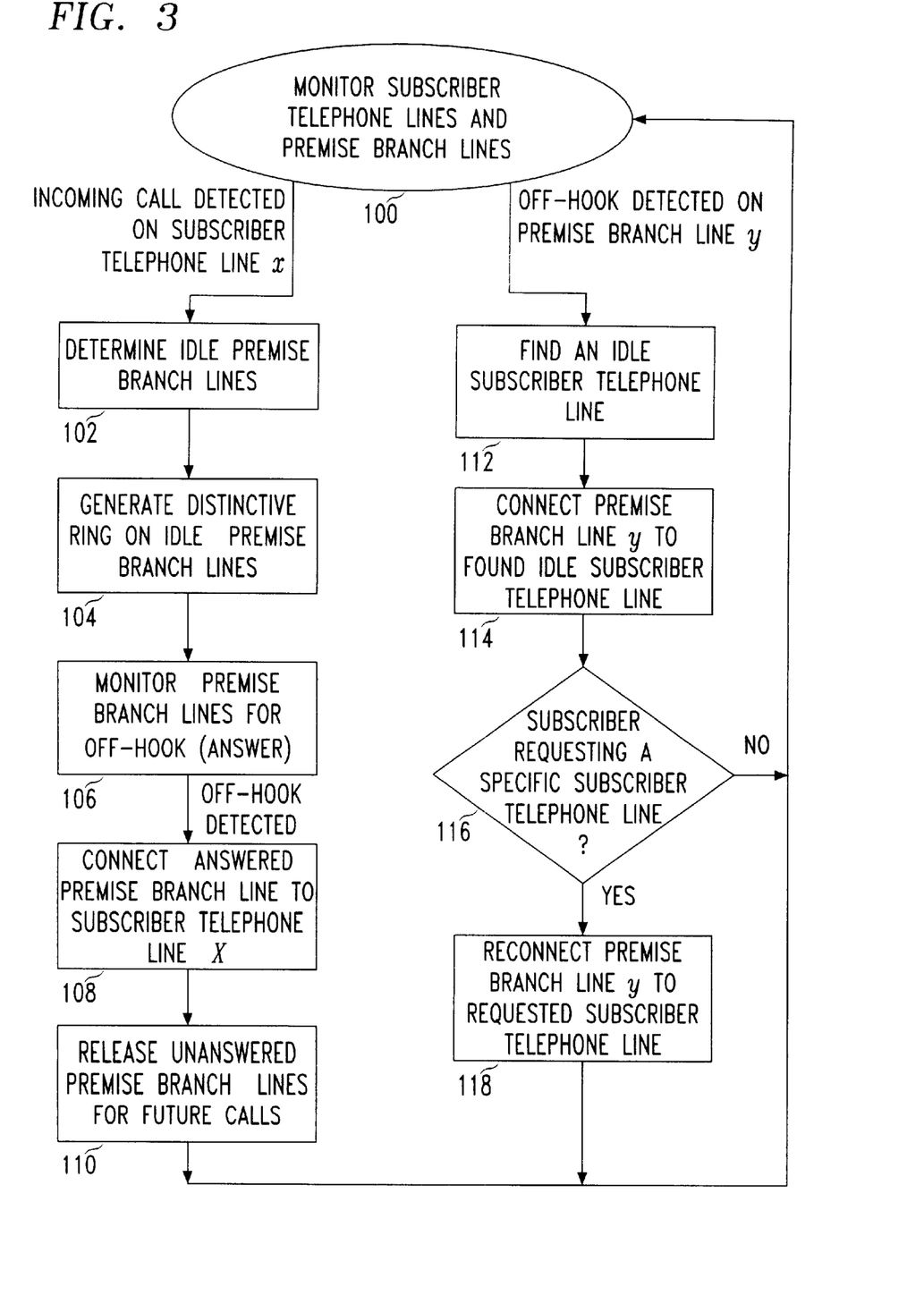
FIG. 3 is a flow chart diagram illustrating the steps executed by a network interface unit of FIG. 2 to dynamically route calls.

FIG. 3 illustrates in flow-chart form the steps of a method executed by the Network Interface Unit 38 of FIGS. 1 and 2 to route incoming calls to, and route out going calls from the telephone sets 12, 14 and 16, 18 and 22, and 20, associated with branch lines 40, 42, 44, and 46, respectively, all of FIG. 1. The method of FIG. 3 commences upon execution of step 100 during which the Network Interface Unit 38 monitors the telephone lines 26–32 to detect an incoming call. During step 100, the Network Interface Unit 38 also monitors the branch premises lines 40–46 to detect an outgoing call initiated from one of the telephone sets 12–22. Upon detecting an incoming call on one of the incoming telephone lines 26–32, the Network Interface Unit determines which of the branch premises lines 40, 42, 44 and 46 of FIG. 1 is idle (step 102). In other words, the Network Interface Unit 38 of FIG. 1 checks whether each telephone set on each branch premises line remains on-hook. Having determined which of the branch premises lines 40, 42, 44 and 46 is idle, the Network Interface Unit 38 then supplies a first ringing signal on each idle premises branch line (step 104) to cause each telephone set on that idle premises branch line to generate a first distinctive ring. In practice, the distinctive ringing corresponds to the particular one of the telephone lines 26–32 on which the call was received.

Following step 104 of FIG. 3, the Network Interface Unit 38 monitors each idle premises branch line during step 106 to detect an off-hook condition (i.e., answering of the call by the subscriber). Upon detecting an off-hook condition, the Network Interface Unit 38 then creates a call path through the switch 63 between the branch premises line on which a telephone set has gone off-hook and the telephone line on which the call arrived to route the incoming call to now-off hook telephone set (step 108). Thereafter, the Network Interface Unit 38 releases the remaining idle branch premises lines for the next call (step 110) and then returns to step 100. Upon receipt of a subsequent incoming call, Network Interface Unit 38 of FIG. 1 re-executes steps 102–110, with the ringing signal generated during step 104 differing from the previously generated ringing signal to differentiate the subsequently received call.

As discussed earlier, the Network Interface Unit 38 of FIG. 1 also creates a call path between a branch premises line and an idle incoming telephone line when a telephone set on a branch premises line goes off-hook upon initiation of an outgoing call by a subscriber. Referring to FIG. 3, if, during step 100 the Network Interface Unit 38 detects an off-hook condition resulting from initiation of an outgoing call by a subscriber, then the Network Interface Unit checks during step 112 for an idle one of the telephone lines 26–32 on which to route the call. Thereafter, the Network Interface Unit 38 of FIG. 1 creates a call path between the particular branch premises line on which a telephone set has gone off-hook, and an idle telephone line during step 114.

In some instances, a subscriber may wish to initiate an outgoing on a specific one of the incoming telephone lines 26, 28, 30, and 32. For example, a specific telephone line, say telephone line 26, may have a toll discount or other calling plan feature that the subscriber may wish to use when making a call. Following initiation of a call during step 114, the Network Interface Unit 38 of FIG. 1 checks during step 116 whether the subscriber has requested a specific incoming line. Typically, the subscriber makes such a request by entering a particular sequence of DTMF signals, or speaking a particular word or phrase for receipt by microprocessor 72 within the Network Interface Unit 38. If the subscriber has requested a specific line during step 116, then the Network Interface Unit 38 alters the previously created call path to connect the premise branch line associated with the telephone set on which the subscriber has gone off-hook to the requested telephone line (step 118). Following step 118, or following step 116 if the subscriber has not requested a specific line, the step 100 is re-executed during which the Network Interface 38 monitors both the incoming lines 26–32 and the branch premises lines 40–46 in the manner described previously.

As thus described, the Network Interface Unit 38 of FIG. 2 provides physical call paths between the incoming lines 26–32 and the branch premises lines 40–46. Unfortunately, this approach does not allow the Network Interface Unit 38 to individually respond to separate telephone sets on the same branch premises line. Thus, the Network Interface Unit 38 cannot route separate calls to the telephone set 14 and 16 on the branch premises line 42 that serves both sets.

Figure 4:
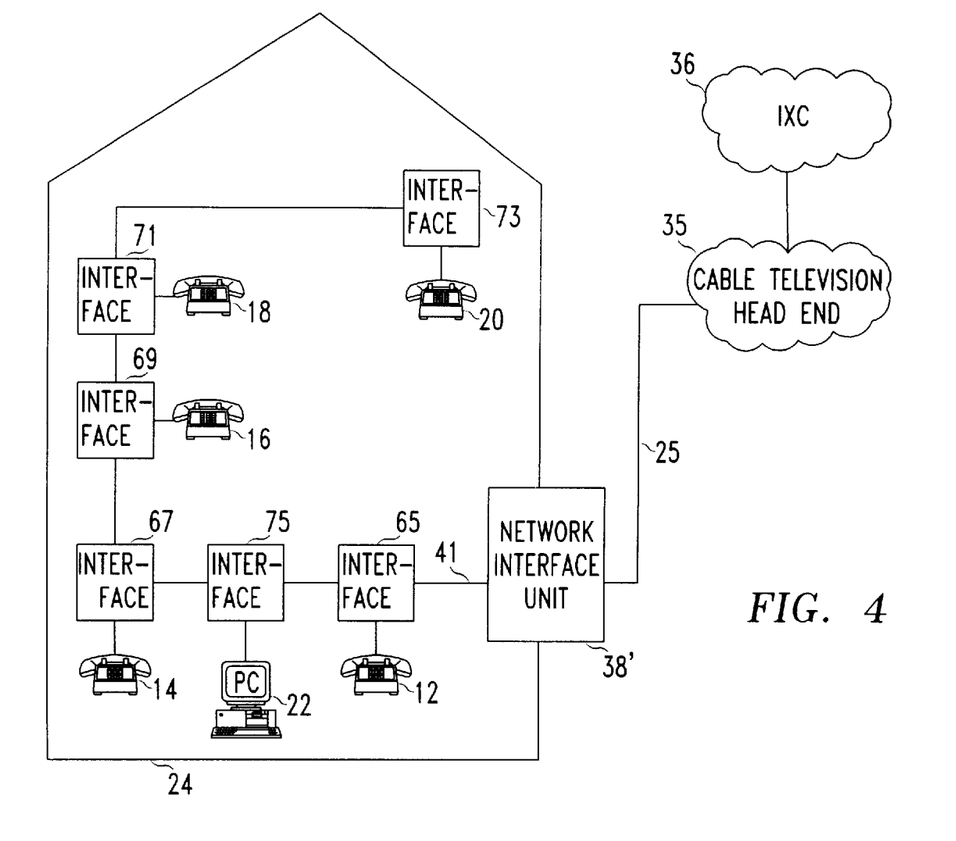
FIG. 4 is a block schematic diagram of an architecture, in accordance with a second embodiment of the invention, for dynamically routing calls to and from each of a plurality of telephone sets at a subscriber's premises

FIG. 4 depicts an architecture, in accordance with a second embodiment of the invention, for dynamically routing calls to and from individual telephone sets 12–22 at the subscriber's premises 24. In the embodiment of FIG. 4, the subscriber premises 24 enjoys a connection through a Network Interface Unit 38' to a cable television head end 35 that provides local telephony service (as well as other services, such as cable television). In the illustrated embodiment, the cable television head-end 35 enjoys a connection to an Inter-exchange Carrier 36 such as AT&T.

At the subscriber premises 24, the Network Interface Unit 38' enjoys a connection through at least one hard-wired premises communications path 41 (typically coaxial cable or twisted copper pair) to the telephone sets 12–22 via a separate one of interfaces 65, 67, 69, 71, 73, and 75 respectively. (In the illustrated embodiment, the premises communications path 41 serves all of the telephone sets 12–22, although, one or more telephone sets could enjoy separate links.) The cable television head-end 35 and the network Interface Unit 38' may employ one of several techniques for transmitting and receiving multiple calls on the incoming communications path 25. For example, both the cable television head-end 35 and the Network Interface Unit 38' could modulate multiple analog calls onto the incoming communications path 25, each at different frequency to simulate calls on separate telephone lines, such as the telephone lines 26, 28, 30, and 32 of FIG. 1.

Alternatively, the cable television head-end 35 and Network Interface Unit 38' could exchange telephone calls in the form of digital packets, with different groups of packets simulating telephone calls on different incoming telephone lines. To that end, a header in one or more of the digital packets representing a call would contain information identifying the equivalent telephone line associated with that call.

Figure 5:
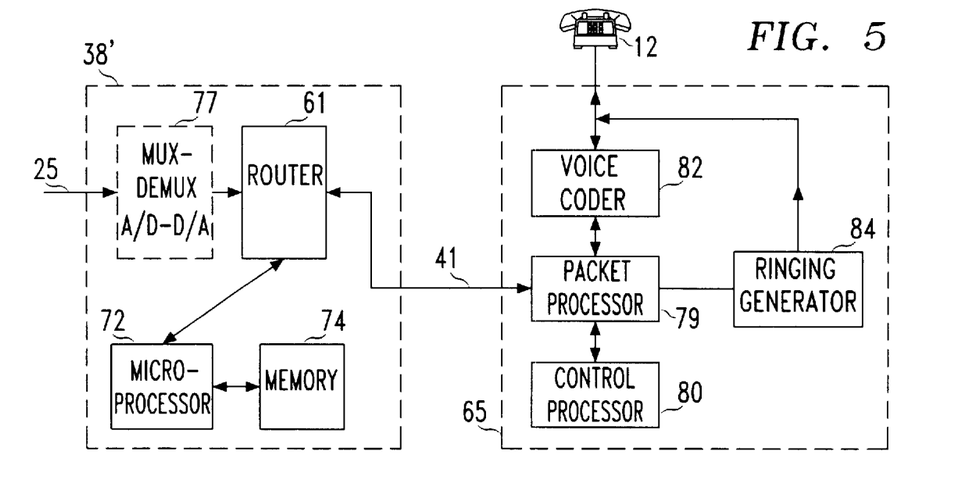
FIG. 5 is a block schematic diagram of a network interface unit comprising part of the architecture of FIG. 4.

FIG. 5 depicts a block diagram of the Network Interface Unit 38' and the interfaces 65, which is representative of the other interfaces 67, 69, 71, 73, and 75 of FIG. 4. The particular structure of the Network Interface Unit 38' depends on the manner in which calls are carried on the communications path 25 as discussed earlier. In the embodiment of FIG. 5, the Network Interface Unit 38' and the cable television head end 35 exchange digital packets that each represent a telephone calls associated with a particular line. To that end, the Network Interface Unit 38' includes a router 61 for routing the digital packets to and for receiving digital packets from the interface 65. As discussed hereinafter, the interface 65 converts packets received from the router 61 into analog speech signals for receipt by the telephone set 12. Conversely, the interface 65 converts analog speech signals from the telephone set 12 into digital packets for transmission to the router 61 within the Network Interface 38'. The router 61 typically operates under the control of microprocessor 72 that receives stored program instructions as well as data from memory 74.

Should the cable television head-end 35 of FIG. 4 modulate calls on the incoming communications path 25 as analog signals at different frequencies rather than transmit calls in the form of digital packets, then the Network Interface Unit 38' would include a combination multiplexer/de-multiplexer and A/D-D/A converter 77 at the front end of the router 61. The multiplexer/de-multiplexer and A/D-D/A converter 77 would demultiplex incoming analog calls and convert them to digital packets for receipt by the router 61. Similarly, the multiplexer/de-multiplexer and A/D-D/A converter 77 would convert outgoing digital packets for transmission to the cable television head-end into analog signals and multiplex such signals onto the communications path 25 at different frequencies.

The interface 65 includes a packet processor 79 that operates under the control of a control processor 80. The packet processor 79 serves to unpack digital packets received at the interface 65 from the router 61 of the Network Interface 38' and separate the packets representing digitized speech for receipt by a voice coder 82. The voice coder 82 converts the packets representing speech into analog speech signals for receipt by the associated telephone set 12. Conversely, the voice coder 82 converts analog speech signals received from the telephone set 12 into digital signals receipt by the packet processor 79, which packs the signals into packets for transmission to the router 61. The voice coder 82 also includes interface circuitry for detecting when the telephone set 12 goes off-hook and for alerting the packet processor 79 accordingly to signal the Network Interface unit 38' of that off-hook condition.

In addition to unpacking the packets received from the router 61 of the Network Interface 38' to yield the digitized speech signals, the packet processor 79 also unpacks digital packets from the router 61 that represent ringing information into digital signals that designate the particular ringing tone for application to the telephone set 12. These digital ringing signals pass to a ringing generator 84 that rings the telephone set 12 with the appropriate ringing tone.

The Network Interface Unit 38' operates in a manner generally similar the operation of the Network Interface Unit 38 illustrated in FIG. 3 with the exceptions noted below. Like the Network Interface Unit 38 of FIG. 2, the Network Interface Unit 38' of FIGS. 4 and 5 checks for incoming calls received on the communications path 25 and also checks for outgoing calls initiated on one of the telephone sets, such as telephone set 12. Upon receipt of an incoming call received on the communications line 25, the Network Interface Unit 38' determines which of the telephone sets 12–22 are idle by querying each of the interfaces 65–75, respectively. Thereafter, the Network Interface Unit 38' signals each interface associated with an idle telephone set to ring that set with a distinctive ring associated with the identity of the equivalent telephone line on which the call is received.

If an interface, such as interface 65, associated with an idle telephone set, (i.e., telephone set 12) detects an off-hook condition, then the interface identifies itself to the Network Interface Unit 38' as having an off-hook telephone set. In response, the Network Interface Unit 38' routes the digital packets representing the call to the interface associated with the off-hook telephone set. Typically, when all of the telephone sets 12–22 enjoy a common premises communications path, such as path 41 in FIGS. 4 and 5, the Network Interface Unit 38' will flood the path with the packets. However, the packets will only contain the address of the interface having the off-hook telephone. The other interfaces will ignore these packets.

The digital packets routed to the interface associated with the now off-hook telephone set are converted by the interface into analog speech signals for receipt by the telephone set. By the same token, the interface coverts speech signals generated at the telephone into digital packets for routing to the Network Interface Unit 38' for subsequent transmission to the cable television head end 35 of FIG. 4. In this way, a subscriber using a telephone set can answer an incoming call and conduct a conversation with a calling party.

The Network Interface Unit 38' routes subsequently received calls (i.e., digital packets representing such calls) in the same manner. Upon receipt of a new call, the Network Interface Unit 38' determines which of the remaining telephone sets 14–22 are idle and then addresses the remaining interfaces 67–75 to cause each interface to ring its associated telephone set with distinctive ring associated with the telephone line on which the subsequent call was received. Once one of the idle telephone sets, say telephone set 14, goes off-hook, the Network Interface Unit 38' routes the digital packets to the interface 67 associated with the telephone set 14.

The Network Interface Unit 38' routes outgoing calls originated on one of the telephone sets 12–26 in a manner similar to the Network Interface Unit 38 of FIGS. 1 and 2 with the exceptions as noted. When one of the telephone sets 12–26 goes off-hook, the associated interface signals the Network Interface Unit 38' which, in turn, signals the cable television head end 35 to set-up a call. In the event that a subscriber desires to complete the call on a particular line, the Network Interface Unit 38' subsequently alerts the cable television head-end 35 of the particular identity of that line, if different from the original line identity. Once the call commences, the network Interface Unit 38' receives digital packets representing the initiated call from interface associated with the now off-hook telephone set and routes those packets to the cable television head-end 35. Conversely, the cable television head-end 35 routes digital packets representing speech from the called party to the Network Interface Unit 38' for delivery to the appropriate interface and conversion thereby into speech signals for receipt by the corresponding telephone set that initiated the call.

As compared to the architecture of FIG. 1, the architecture of FIG. 4 permits routing of a call to any particular telephone set, even if all of the sets are served by a common premises communications path, such as path 25 of FIG. 4. While the architecture of FIG. 4 has described with each interface including packet processor 79, control processor 80, voice coder 82 and ringing generator 84, one or more of these elements could be included within the telephone set associated with that interface.

Figure 6:
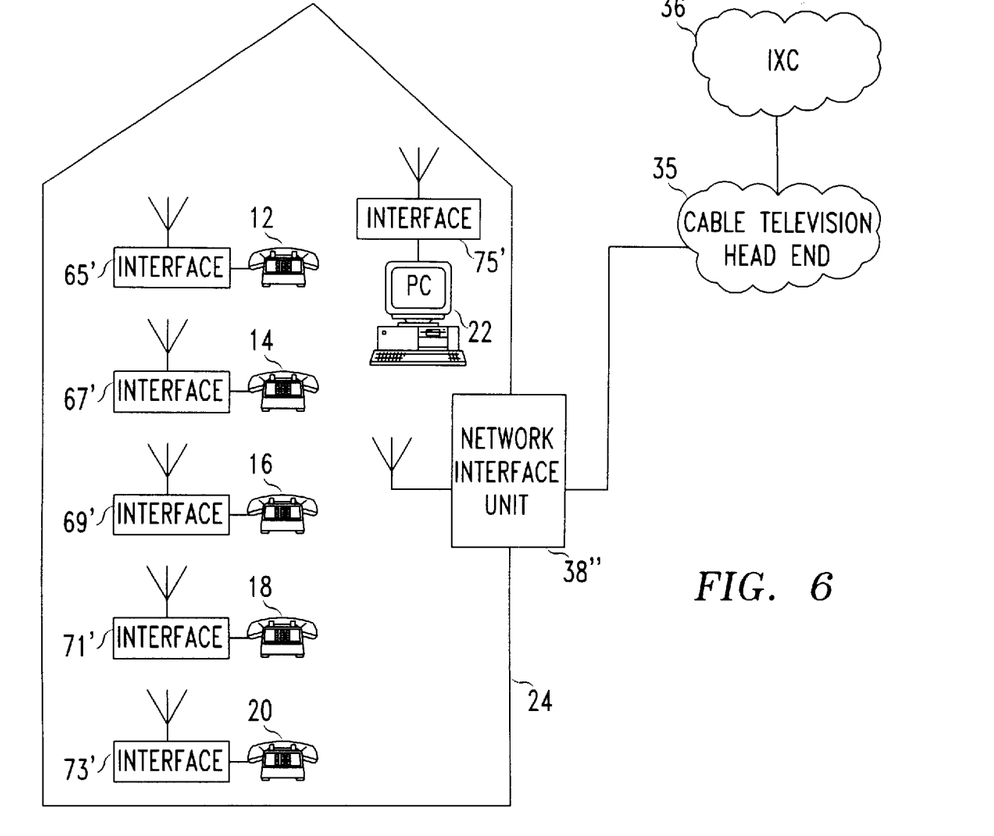
FIG. 6 is a block schematic diagram of an architecture, in accordance with a third embodiment of the invention, for dynamically routing calls to and from individual telephone sets at a subscriber's premises.

FIG. 6 depicts an architecture, in accordance with a third embodiment of the invention, for dynamically routing calls to and from individual telephone sets 12–22 at the subscriber's premises 24. The architecture of FIG. 6 the includes a communications path 25 extending between a Network Interface Unit 38" at the subscriber premises 24 and a cable television head end 35 that provides local telephony service (as well as other services, such as cable television). Typically, the cable television head-end 35 enjoys a connection to an Inter-exchange Carrier 36 such as AT&T. At the subscriber premises 24, the Network Interface Unit 38" enjoys a wireless connection to the telephone sets 12–22 via a separate one of interfaces 65', 67', 69', 71', 73' and 75', respectively.

Figure 7:
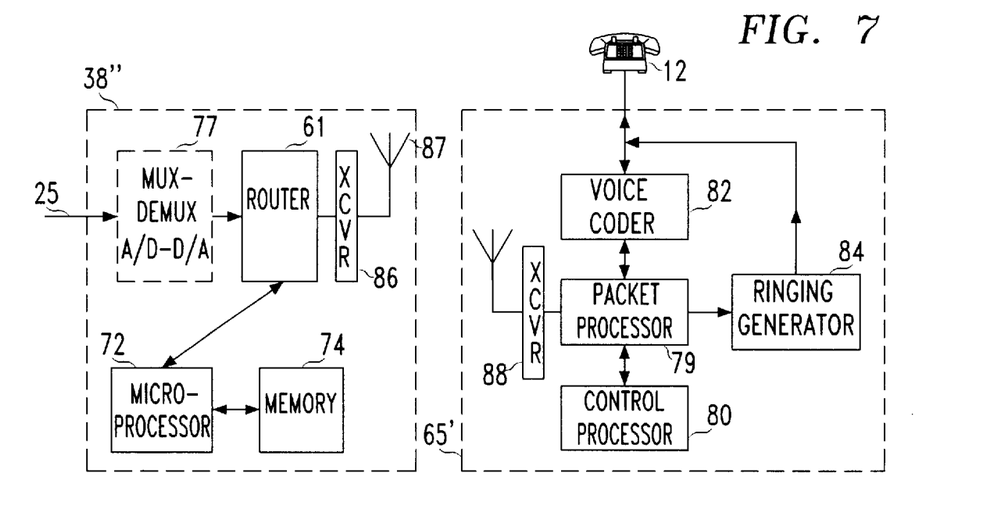

FIG. 7 depicts a block diagram of the Network Interface Unit 38" and the interface 65', which is representative of the other interfaces 67', 69', 71', 73' and 75' of FIG. 6. Like the network Interface 38' of FIG. 5, the particular structure of the Network Interface Unit 38" depends on the manner in which multiple calls are carried on the communications path 25 as discussed earlier. In the embodiment of FIG. 7, the Network Interface Unit 38' and the cable television head end 35 of FIG. 6 exchange digital packets that comprise telephone calls. To that end, the Network Interface Unit 38" includes a router 61 for routing the digital packets representing telephone calls to and from the interface 65. The router 61 typically operates under the control of microprocessor 72 that receives stored program instructions as well as data from memory 74. Should the cable television head-end 35 of FIG. 4 modulate calls on the incoming communications path 25 as analog signals at different frequencies rather than digital packets, then the Network Interface Unit 38' would include the combination multiplexer/de-multiplexer and A/D-D/A converter 77 at the front end of the router 61 as described previously.

To communicate in a wireless manner with each of the interfaces 65'–75', the Network Interface Unit 38" includes a multi-channel transceiver 86 that coupled to a multi-channel antenna 87, each channel associated with a particular one of the interfaces 65'–75', respectively. The transceiver 86 transmits the digital packets to and receives digital packets from each interface, such as interface 65'.

The interface 65' includes the same elements as the interface 65 of FIG. 5, including the packet processor 79, the control processor 80, the voice coder 82 and the ringing generator 84. In addition, the interface 65' of FIG. 7 includes a single channel transceiver 88 and antenna 90. The transceiver 88 lies at the front end of the packet processor 79 for communicating in a wireless manner with the transceiver 86 within the Network Interface 38".

The Network Interface Unit 38" and interface 65' of FIG. 7 operate in substantially the same manner as the Network Interface Unit 38' and interface 65 of FIG. 5 with the following exception. Rather than employ the hard-wired communications path 41 of FIGS. 4 and 5 to carry packets, the Network Interface Unit 38" and interface 65' of FIG. 7 exchange packets via a wireless channel. This approach obviates the need to run wiring in a subscriber premises.

The foregoing describes a technique for dynamically routing calls to and from each of a plurality of telephone 12–22 sets at a subscriber's premises 24 to allow each set to receive or initiate a call on one of a plurality of incoming lines or their equivalent.

The above-described embodiments merely illustrate the principles of the invention. Those skilled in the art may make various modifications and changes that will embody the principles of the invention and fall within the spirit and scope thereof.

What is claimed is:

1. A method for dynamically routing calls to and from each of a plurality of telephone sets having associated premises communication paths, comprising the steps of:

monitoring the premises communication path associated with each telephone set to check for availability in response to (i) receipt of an incoming telephone call or (ii) initiation of an outgoing call at one of the telephone sets;

responsive to receipt of an incoming call, (1) determining which of the associated communications paths is idle, (2) applying a distinctive ringing signal on each idle communications path to cause each telephone set associated with each said idle path to generate a distinctive ring on each telephone set on that path corresponding to a characteristic of the incoming call to signal a subscriber to go off-hook on a telephone set on one of said idle paths, and (3) routing the incoming call to said off-hook telephone set while releasing the remaining idle paths, and responsive to initiation of an outgoing call by a subscriber going off hook on a telephone set, routing the outgoing call to a called party.

2. The method according to claim 1 wherein the step of routing the incoming call to the off hook telephone set includes the step of establishing a physical link to that telephone for the duration of the call.

3. The method according to claim 1 wherein the incoming call comprises a stream of digital packets and wherein the step of routing the call includes the steps of:

transmitting the digital packets on the communications path toward the off hook telephone; and converting the packets to analog speech signals receipt at the off-hook telephone.

4. The method according to claim 3 wherein the step of applying a distinctive ringing signal includes the step of unpacking the packets to derive signals that indicate the distinctive ring.

5. The method according to claim 4 wherein the signals that indicate the distinctive ring provide an indication of an equivalent telephone line on which the incoming call was received.

6. The method according to claim 1 wherein each incoming call to the subscriber is carried one of a plurality of telephone lines, and wherein the distinctive ring corresponds to the identity of said incoming line carrying that incoming call.

7. The method according to claim 6 wherein each outgoing call initiated by a subscriber is carried on one of said plurality of telephone lines.

8. A method for dynamically routing calls to each of a plurality of telephone sets having associated communication paths at a subscriber premises, comprising the steps of:

monitoring the communication path associated with each telephone set to check for availability in response to receipt of an incoming telephone call;

determining which of the associated communications paths is idle, applying a distinctive ringing signal on each idle communications path to cause each telephone set associated with each said idle path to generate a distinctive ring on each telephone set on that path corresponding to a characteristic of the incoming call to signal a subscriber to go off-hook on a telephone set on one of said idle paths, and routing the incoming call to said off-hook telephone set while releasing the remaining idle paths.

9. The method according to claim 8 wherein the step of routing the incoming call to the off hook telephone set includes the step of establishing a physical link to that telephone for the duration of the call.

10. The method according to claim 8 wherein the incoming call comprises a stream of digital packets and wherein the step of routing the call includes the steps of:

transmitting the digital packets on the communications path toward the off hook telephone; and converting the packets to analog speech signals for receipt at the off-hook telephone.

11. The method according to claim 10 wherein the step of applying a distinctive ringing signal includes the step of unpacking the packets to derive signals that indicate the distinctive ring.

12. The method according to claim 11 wherein the signals that indicate the distinctive ring provide an indication of an equivalent telephone line on which the incoming call was received.

13. The method according to claim 8 wherein each incoming call to the subscriber is carried one of a plurality of telephone lines, and wherein the distinctive ring corresponds to the identity of said incoming line carrying that incoming call.

14. Apparatus for dynamically routing calls to and from each of a plurality of telephone sets having associated premises communication paths at a subscriber premises, comprising:

at least one interface associated with each communications path; and a network interface unit for coupling each interface to a distribution communications path, the network interface unit being responsive to (i) receipt of an incoming telephone call and (ii) initiation of an outgoing call at one of the telephone sets for responding to receipt of an incoming call by (1) determining which of the associated communications paths is idle, (2) applying a distinctive ringing signal on each idle communications path to cause each telephone set associated with each said idle path to generate a distinctive ring on each telephone set on that path corresponding to a characteristic of the incoming call to signal a subscriber to go off-hook on a telephone set on one of said idle paths, and (3) routing the incoming call to said off-hook telephone set while releasing the remaining idle paths, and for responding to initiation of an outgoing call by routing the outgoing call to a called party.

15. The apparatus according to claim 14 wherein the distribution communications path includes a plurality of individual telephone lines and wherein the network interface unit comprises a for providing discrete call paths (physical links) between any of the premises communication paths and any of the individual telephone lines for the duration of each call.

16. The apparatus according to claim 14 wherein each call comprises a stream of digital packets and wherein the network interface unit comprises a router for routing said digital packets to, and for receiving digital packets from each interface.

17. The apparatus according to claim 16 wherein each interface comprises:

a packet processor for unpacking digital packets received at the interface to separate the packets representing digitized speech from packets containing ringing information;

a voice coder for the packets representing speech into analog speech signals for receipt by the associated telephone and for converting analog speech signals received from the telephone set into digital signals receipt by the packet processor;

a ringing generator that rings the telephone sets with the ringing tones in accordance with the ringing information; and a control processor for controlling the packet processor.

* * * * *